United States Patent Office 3,166,601
Patented Jan. 19, 1965

3,166,601
CHLORINATION OF ETHANE
Keith M. Taylor, Dickinson, Tex., assignor to Monsanto Company, a corporation of Delaware
No Drawing. Filed Feb. 21, 1961, Ser. No. 90,618
3 Claims. (Cl. 260—654)

The present invention relates to a process for the chlorination of ethane. More particularly, the invention relates to a new and improved method for the chlorination of ethane or ethane-containing streams to produce valuable unsaturated chlorinated products.

A particular object of the invention is to provide a process in which vinyl chloride or chlorinated ethylenes such as trichloroethylene and perchloroethylene can be produced in good yield by the direct one-step chlorination of ethane. Most of the conventional methods for producing vinyl chloride from ethane involve two distinct steps: (1) chlorination of the $C_2$ hydrocarbon to yield 1,2-dichloroethane followed by (2) pyrolysis or alkaline dehydrochlorination of the dichloroethane to the vinyl monomer. In addition to the fact that two steps are involved, there are certain other drawbacks in these processes. In the conversion of the dichloroethane by pyrolysis, for example, yields are poor, undesirable by-products are produced, considerable technical difficulty is entailed in recovery of the product and operational difficulties are prevalent because of the formation of coke deposits in the tubular reactors employed. Similarly, in the chemical dehydrochlorination of the dichloroethane substantial quantities of by-products are formed and the necessity for providing carriers for the alkalies employed and the concomitant losses of these materials makes the process uneconomical. Further, the only known thermal processes for producing vinyl chloride directly by chlorination of ethane are those wherein other products such as vinylidene chloride and ethyl chloride are produced simultaneously and in yields predominating over that of the vinyl chloride.

Likewise, most of the prior art processes available for producing chlorinated ethylenes such as trichloroethylene and perchloroethylene from ethane require conversion of the ethane to the chloroethanes and subsequent dehydrochlorination of these compounds by means of an alkali such as lime. Here again the same disadvantages with respect to undesirable by-products, operating difficulties, and poor yields which characterize the vinyl chloride processes mentioned are encountered. The only processes for making the chlorinated ethylenes directly from ethane require passing the hydrocarbon with chlorine into molten metallic chlorides or feeding carbon tetrachloride with the ethane. The advantages of a process requiring no catalysts and no added component in the feed are obvious.

It has now been determined that the direct vapor-phase chlorination of ethane can be so conducted that the principal reaction product is either vinyl chloride in yields of better than 90% based on the ethane reacted or a mixture of trichloroethylene and perchloroethylene in comparable yields. According to the invention, these unsaturated chlorinated products are obtained by chlorinating ethane under the following conditions: (1) a molar ratio of chlorine to ethane of 1.0 to 4.0 is maintained; (2) the reaction temperature is regulated in the range from about 600° C. to about 900° C.; (3) the average residence time of the gases in the reaction zone is between about 1 and about 50 milliseconds; and (4) an inert diluent gas is admixed with the reaction gases in sufficient volume to maintain the gases out of the flammable region.

The invention is illustrated in the following examples which, however, are not to be construed as limiting it in any manner whatsoever.

*Example 1*

Ethane and chlorine in mole proportions of 1:1.5 were premixed with 50% by volume of helium and passed through a heated reactor consisting of a quartz tube 0.8 cm. in outside diameter and of a length selected to give the desired reaction time. Heat to the reactor was supplied by means of a 4-inch electrical furnace and the temperature was maintained at about 850° C. The average residence time of the gases in the reaction zone was about 15 milliseconds. The effluent gases from the reactor were passed through a water scrubber and a drying tower to remove HCl after which they were fed to a gas chromatograph equipped with an automatic printing integrator for analysis. The gaseous product contained vinyl chloride in an amount representing a yield of 78% based on the ethane reacted and only minor proportions of vinylidene chloride, ethyl chloride and 1,1-dichloroethane.

*Example 2*

Ethane and chlorine in mole proportions of 1:3.5 were premixed with 50% by volume of helium and passed through the reactor of Example 1 maintained at a temperature of about 650° C. Residence time of the gases in the reactor was approximately 5 milliseconds. The effluent gas was recovered and analyzed in the same manner as in the previous example. Vinyl chloride was obtained in 97% yield. A very small amount of 1,2-dichloroethane was the only other chlorinated hydrocarbon in the product.

*Example 3*

A mixture of ethane and chlorine in mole proportions of 1:3.5 was diluted with 50% by volume of helium and passed through the reactor of Example 1 controlled to maintain a reaction temperature of 750° C. Residence time of the gases in the reaction zone was about 10 milliseconds. Recovery and analysis of the gaseous product as in Example 1 established that the combined yield of trichloroethylene and perchloroethylene based on ethane reacted was 85%. Only a small amount of vinyl chloride appeared in the product together with small amounts of trichloroethane, tetrachloroethane and dichloroethylene.

*Example 4*

Following the same procedure recited in the previous examples, ethane and chlorine in mole proportions of 1:4 diluted 50% by volume with helium were reacted at 650° C. and a residence time of 15 milliseconds. Trichloroethylene and perchloroethylene were the predominating products of the reaction in that these products combined represented a yield of 95% based on ethane reacted with only small amounts of dichloroethylene, tetrachloroethane and 1,1,1-trichloroethane being produced and only a trace of vinyl chloride.

It will be seen from the examples that vinyl chloride or chlorinated ethylenes can be produced in excellent yield by direct chlorination of ethane at high temperatures and ultra short residence times. By controlling the temperature in the range from 650° C. to 850° C., and the ethane-chlorine ratio from 1.5 to 3.5 with residence times from 5–15 milliseconds, vinyl chloride is obtained as the major product of the chlorination reaction. Optimum yields within this range are obtained by using the shortest residence time with the highest mole ratio of reactants at the lower end of the temperature range. When these conditions are varied so that mole ratios of 3.5 to 4.0 are used with residence times of 10 to 15 milliseconds at 650° C. to 750° C., chlorinated ethylenes are produced instead of vinyl chloride. While the general range of conditions for formation of vinyl chloride or tri- and perchloroethylene overlap to some extent, the process can be readily controlled to yield the desired product since the more drastic chlorinating conditions, i.e., longer residence times, higher chlorine-to-ethane ratios and higher temperatures, produce chlorinated ethylenes while the milder conditions yield vinyl chloride.

Variations in procedure from that given in the examples can, of course, be made without departing from the scope of the invention. For instance, while helium was used as the diluent in the examples to facilitate analysis of the products by gas chromatographic means, other inert gases such as nitrogen, argon, and the like are equally suitable. In practical operation the preferred diluent is hydrogen chloride since this gas is formed in the reaction and can be separated from the reaction products and recycled in the required amounts to provide for shorter residence times and avoid the flammable region of ethane-chlorine mixtures.

Likewise, while preferred residence times are those from about 5 to about 15 milliseconds, residence times varying from about 1 to about 100 milliseconds can be employed.

The process of the invention produces remarkably clean reaction product mixtures. Not only are they free of carbon, they are virtually water-white and free of tars and other high-boiling undesirable products which greatly simplifies the purification process for recovery of a particular chlorinated product.

What is claimed is:

1. A process for the chlorination of ethane to produce unsaturated chlorinated hydrocarbons which comprises reacting ethane with chlorine in a reaction zone heated to a temperature in the range from about 600° C. to about 900° C., the mole ratio of chlorine to ethane being in the range from about 1.0 to 4.0, said gaseous mixture of chlorine and ethane being diluted with an inert gas in sufficient concentration by volume to maintain the gaseous mixture out of the flammable region, and the residence time of the reacting gas mixture in the reaction zone being maintained within the range from about 1 to about 50 milliseconds.

2. A process for the chlorination of ethane to produce vinyl chloride which comprises reacting ethane and chlorine in mole proportions from about 1:1.5 to about 1:3.5 in a reaction zone heated to a temperature in the range from about 650° C. to about 850° C., said gaseous mixture of chlorine and ethane being diluted with 50% by volume of an inert gas and the residence time of the reacting gas mixture in the reaction zone being maintained within the range from about 5 to about 15 milliseconds.

3. A process for the chlorination of ethane to produce chlorinated ethylenes which comprises reacting ethane with chlorine in mole proportions of from about 1:3.5 to about 1:4 in a reaction zone heated to a temperature in the range from about 650° C. to about 750° C., said gaseous mixture of ethane and chlorine being diluted with 50% by volume of an inert gas and the residence time of the reacting gas mixture in the reaction zone being maintained within the range from about 10 to about 15 milliseconds.

References Cited in the file of this patent

UNITED STATES PATENTS

| | | |
|---|---|---|
| 2,334,033 | Riblett | Nov. 9, 1943 |
| 2,628,259 | Dirstine et al. | Feb. 10, 1953 |
| 2,838,579 | Conrad et al. | June 10, 1958 |

FOREIGN PATENTS

| | | |
|---|---|---|
| 671,947 | Great Britain | May 14, 1952 |